(12) United States Patent
Andersen et al.

(10) Patent No.: US 11,146,100 B2
(45) Date of Patent: Oct. 12, 2021

(54) POWER SUPPLY SYSTEM AND METHOD (71) Applicant: SIEMENS ENERGY AS, Oslo (NO)

(72) Inventors: Rune B. Andersen, Oslo (NO); Harald Kjesbu, Hell (NO); Haavard Lund, Oslo (NO)

(73) Assignee: SIEMENS ENERGY AS, Oslo (NO)

( * ) Notice: Subject to any disclaimer, the term of this patent is extended or adjusted under 35 U.S.C. 154(b) by 0 days.

(21) Appl. No.: 16/612,870

(22) PCT Filed: May 17, 2018

(86) PCT No.: PCT/EP2018/062981
§ 371 (c)(1),
(2) Date: Nov. 12, 2019

(87) PCT Pub. No.: WO2018/215307
PCT Pub. Date: Nov. 29, 2018

(65) Prior Publication Data
US 2020/0144853 A1 May 7, 2020

(30) Foreign Application Priority Data

May 25, 2017 (EP) ..................................... 17172947

(51) Int. Cl.
*H02J 9/06* (2006.01)
*H02J 7/00* (2006.01)
(Continued)

(52) U.S. Cl.
CPC ................ *H02J 9/06* (2013.01); *E21B 41/00* (2013.01); *H02J 3/32* (2013.01); *H02J 7/0068* (2013.01); *H02J 7/02* (2013.01); *H02M 7/5387* (2013.01)

(58) Field of Classification Search
CPC . E21B 41/00; H02J 3/32; H02J 7/0068; H02J 7/02; H02J 9/06; H02J 9/061; H02J 9/062; H02M 7/5387
(Continued)

(56) References Cited

U.S. PATENT DOCUMENTS

2005/0285554 A1* 12/2005 King ....................... B60L 50/60
318/376
2010/0109585 A1  5/2010 Iwahori et al.
(Continued)

FOREIGN PATENT DOCUMENTS

CN       103414180 A    11/2013
EP       2079161 A1     7/2009
(Continued)

OTHER PUBLICATIONS

International search report and written opinion dated Oct. 2, 2018 for corresponding PCT/EP2018/062981.

*Primary Examiner* — Toan T Vu
(74) *Attorney, Agent, or Firm* — Wolter Van Dyke Davis, PLLC (57) ABSTRACT

A power supply system has a primary power source and an energy storage system. The primary power source is adapted to supply power on demand to a load. One or more energy storage modules of the energy storage system are adapted to receive regenerative power from the load. The power supply system further includes a converter connected between the load, the energy storage system; and the primary power source, the converter has a three phase voltage source converter and an additional two pulse bridge. A blocking diode is connected between the load and the converter.

10 Claims, 6 Drawing Sheets

(51) Int. Cl.
  *H02J 3/32* (2006.01)
  *H02J 7/02* (2016.01)
  *H02M 7/5387* (2007.01)
  *E21B 41/00* (2006.01)

(58) Field of Classification Search
  USPC .............................................. 307/80, 20–26
  See application file for complete search history.

(56) References Cited

U.S. PATENT DOCUMENTS

| | | | |
|---|---|---|---|
| 2011/0011658 A1 | 1/2011 | Takizawa | |
| 2012/0302112 A1 | 11/2012 | Hartig et al. | |
| 2013/0002186 A1* | 1/2013 | Iwahori | B60L 50/61 |
| | | | 318/722 |
| 2013/0313894 A1* | 11/2013 | Settemsdal | B60R 16/033 |
| | | | 307/9.1 |
| 2014/0361621 A1* | 12/2014 | Lindtjorn | H02J 1/06 |
| | | | 307/38 |
| 2018/0159330 A1* | 6/2018 | Kang | B63J 99/00 |

FOREIGN PATENT DOCUMENTS

| | | |
|---|---|---|
| EP | 2224571 A1 | 9/2010 |
| EP | 2538543 A1 | 12/2012 |
| JP | 2016208761 A | 12/2016 |

* cited by examiner

POWER SUPPLY SYSTEM AND METHOD

CROSS REFERENCE TO RELATED APPLICATIONS

This application is the US National Stage of International Application No. PCT/EP2018/062981 filed 17 May 2018, and claims the benefit thereof. The International Application claims the benefit of European Application No. EP17172947 filed 25 May 2017. All of the applications are incorporated by reference herein in their entirety.

FIELD OF INVENTION

This invention relates to a power supply system and method of operation, in particular for drilling rig, for example on a vessel, or platform.

BACKGROUND OF INVENTION

In oil and gas production, drilling equipment on drilling rigs, whether onshore or offshore, produces heat and needs to be cooled. However, produced motor braking energy is usually dissipated in a string of resistors and the resistors are then cooled in water. This is wasteful of energy and may be objected to for environmental reasons.

SUMMARY OF INVENTION

In accordance with a first aspect of the present invention, a power supply system comprises a primary power source and an energy storage system, wherein the primary power source is adapted to supply power on demand to a load; and wherein one or more energy storage modules of the energy storage system are adapted to receive regenerative power from the load; the power supply system further comprising a converter connected between the load, the energy storage system; and the primary power source; and a blocking diode connected between the load and the converter; wherein the converter comprises a three phase voltage source converter and an additional two pulse bridge.

The blocking diode allows the voltage level of the converter and the voltage level of the load DC bus to be independent of one another.

The voltage source converter may comprise a six pulse transistor module.

The transistor module may comprise six insulated gate bipolar transistors with inverse parallel diodes.

The additional two pulse bridge may comprise insulated gate bipolar transistors with inverse parallel diodes.

The energy storage system may comprise one or more energy storage modules connected to the additional two pulse bridge of the converter, The primary power source may comprise energy from a primary energy store, but advantageously the primary power source comprises an AC generator; and the power supply system further comprises a transformer comprising primary and secondary windings between the AC generator and the converter.

This transforms the AC voltage to a suitable level before conversion to DC.

The energy storage system may further comprise an energy management system, whereby the energy storage system is further adapted to receive power from the primary power source, if the load demand is below the available power from the primary power source.

In accordance with a second aspect of the present invention, a method of operating a power supply system according to the first aspect comprises one of supplying power from a primary power source to a load; detecting an excess of available power over demand and redirecting the excess power to the energy storage system; or supplying power from a primary power source to a load; detecting a lack of available power over demand and drawing power from the energy storage system; or receiving regenerative energy from the load and storing the regenerative energy in the energy storage system.

BRIEF DESCRIPTION OF THE DRAWINGS

An example of a power supply system in accordance with the present invention will now be described with reference to the accompanying drawings in which.

DETAILED DESCRIPTION OF INVENTION

The present invention addresses the efficiency and environmental objections to the conventional systems by means of a converter which enables a combination of energy storage with braking power of drilling equipment drives. On drilling rigs, drilling vessels, or offshore drilling platforms, there is a large load demand for the drilling drives. In addition, for offshore drilling vessels, there is a large load demand from the thruster drives. Typically, this load demand is met by generators, such as diesel generators, providing the primary source of power. However, because the load profile of the drilling drives and thruster drives in not constant, the generators are often operating in an inefficient manor. In the case of the drilling drives, the high regenerative power is conventionally burnt off in a string of resistors and these are cooled by the vessel's cooling water, or for land based rigs, from a cooling water supply.

Instead of simply dissipating this energy, an energy storage system receives the regenerative power and stores it for use at a later time. This helps smooth out the load demand, as stored energy may be used, rather than having to run an additional generator to meet a temporarily higher demand from the drilling drives, or thruster drives. The energy storage system effectively operates as if it were a generator to support the vessel network with the varying load demand. Thus, with the availability of energy storage as a pseudo generator, the system is more environmentally friendly.

More generally, the generators can be set up to operate more efficiently because when there is otherwise insufficient demand for the generators to run at optimum loading, then the excess power produced is directed to the energy storage system and stored, rather than running the engine at lower loads.

U.S. Pat. No. 8,446,037 describes an energy storage system which connects an energy store to a DC bus, in addition to connecting one or more loads to the DC bus.

The present invention provides a solution to the problem discussed above by providing a direct connection from an energy storage system to a converter between a DC bus and the load that is served by that converter. This converter may be connected to energy storage, such as batteries by a step up chopper in order to get correct internal DC voltage in the converter. The connection from converters 21 to a drilling drive DC bus 10 is by blocking diodes 11 which enable a higher DC voltage in the energy storage converter 21 than on the drilling drive DC bus. The energy storage system may use a transformer of the drilling drive to connect to a medium voltage network of the vessel, or rig. Medium voltage as referred to herein includes voltages in the range from 1.5 kV to 20 kV, for example a network operating at 440V AC, or 11 kV AC comes within the scope of medium voltage. As mentioned above, the thruster drives have a variable load requirement.

Figure 1:
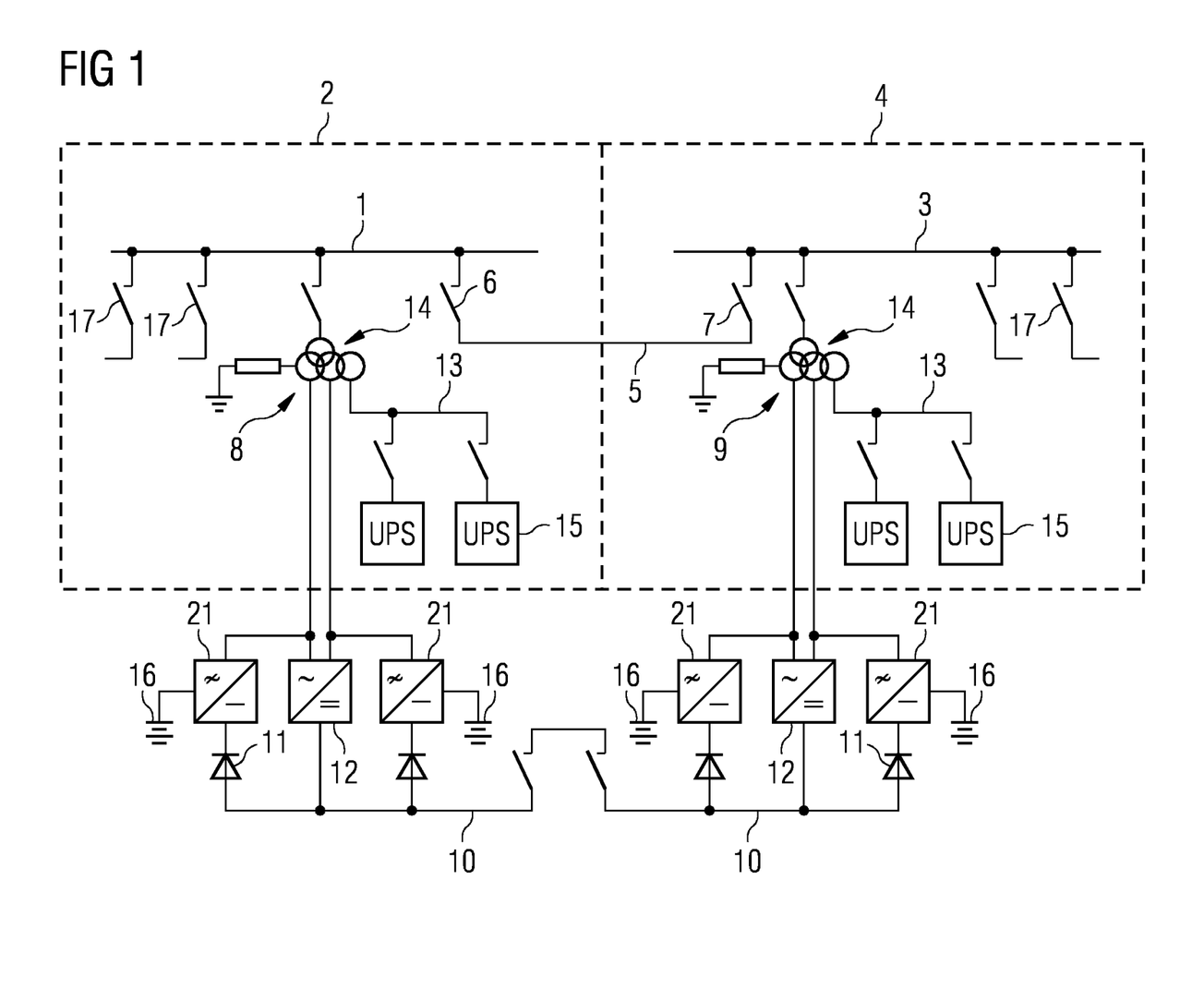
FIG. 1 illustrates an example of a power supply system according to the invention.

An example of a power distribution network comprising a power supply system according to the present invention is illustrated in FIG. 1. In order to satisfy the regulatory redundancy requirements for vessels, or offshore platforms, the power supply system may be split between two switchboards, connected by a normally closed breaker, which in the event of a fault on one switchboard, opens, to prevent the fault causing damage to equipment on the other switchboard. In this example a first switchboard section 1 is provided in a first system section 2 and a second switchboard section 3 is provided in a second system section 4. Other arrangements, for example multiple interconnected subsections making up each switchboard section 1, 3, or additional switchboards connected in series by breakers are also possible.

A typical AC network voltage for a drilling vessel is 11 kV 60 Hz, produced by onboard generators, for example diesel generators, or gas turbines. For this example, the switchboard 1, 3 may be rated for 1250A operational current and a short circuit rating of 25 kA for 1 s, but other higher ratings are possible according to the application. The switchboards are connected together via a bus tie 5 and bus tie breakers 6, 7, with the same operational current rating. Breakers 17 may connect the switchboards to other switchboards (not shown) in a closed ring configuration, for example as described in WO2016001272, A three phase transformer 8, 9, in this example rated for 6000 kVA apparent power, may be connected to the switchboard 1, 3 via a breaker and transform the network voltage to a suitable voltage for the drilling load DC bus 10, in this example 690V AC. The transformed AC voltage is then converted from AC to DC in converters 21, 12. Additionally, an energy storage AC switchboard 13 at the transformed AC voltage may be connected through a further transformer winding 14 of the transformer 8, 9. Uninterruptable power supplies (UPS) 15, operating at 110 VDC, may be connected to this lower voltage switchboard to provide control power for all logic functions, with conversion from AC to DC, or vice versa, inside the UPS.

The drilling drive, DC bus 10 may be connected to the converter via diodes 11 in series with the converter, referred to as blocking diodes, enabling regenerative power from the drilling drive to be transferred to the energy storage system. Unlike the prior art, the energy storage modules 16 of the energy storage system are connected to the converter, not to the drilling, DC bus 10. For each system section 2, 4, energy storage modules 16 may be provided, connected to the converter 21, so that additional energy from the modules 16 may be supplied to the drilling drives, or the drilling drives may return regenerative power to the energy storage modules 16, or the transformed power from the AC network may be supplied to the energy storage modules if the demand from the thrusters and drilling drives is lower than the available power from the network.

Figure 2A:
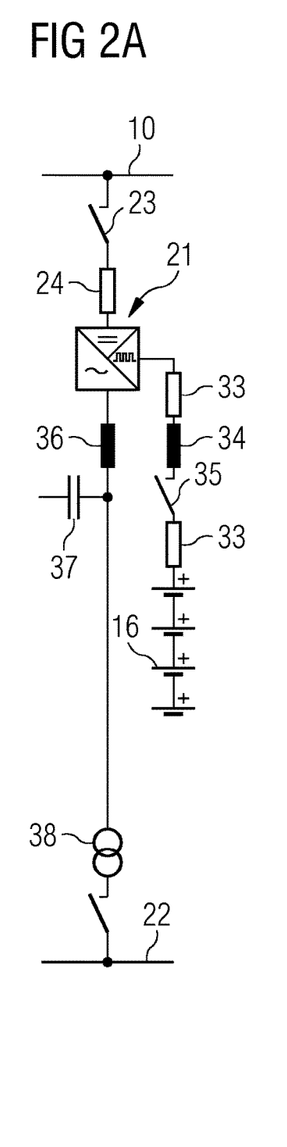
FIGS. 2a and 2b illustrate detail of implementations of part of the system of FIG. 1.
Figure 2B:
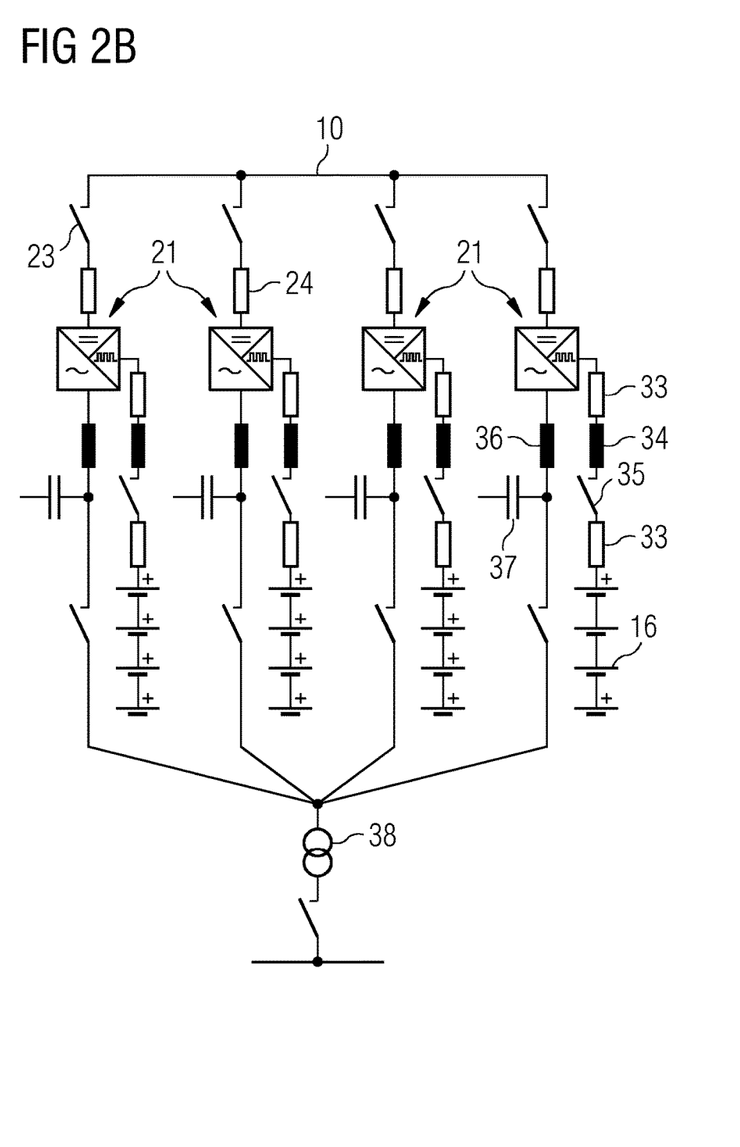

The converters and the connection between the energy storage modules 16 and the DC bus are shown in more detail in FIGS. 2a and 2b. FIG. 2a illustrates an example of a single converter 21, capable of converting from AC to DC, or from DC to AC, for the power system of the present invention showing the connection from the DC bus 10 to a load AC bus 22 via converter 21. A switch, or breaker 23 and fuse 24 may be provided in the line between the DC bus 10 and the converter 21. FIG. 2b shows an alternative arrangement in which there are multiple converters 21 in parallel, connected to a single transformer 38, but otherwise having the same features as shown in the single converter example of FIG. 2a. In this case the output frequency and pulses need to be synchronized to avoid oscillations between individual converter units 21.

Figure 3:
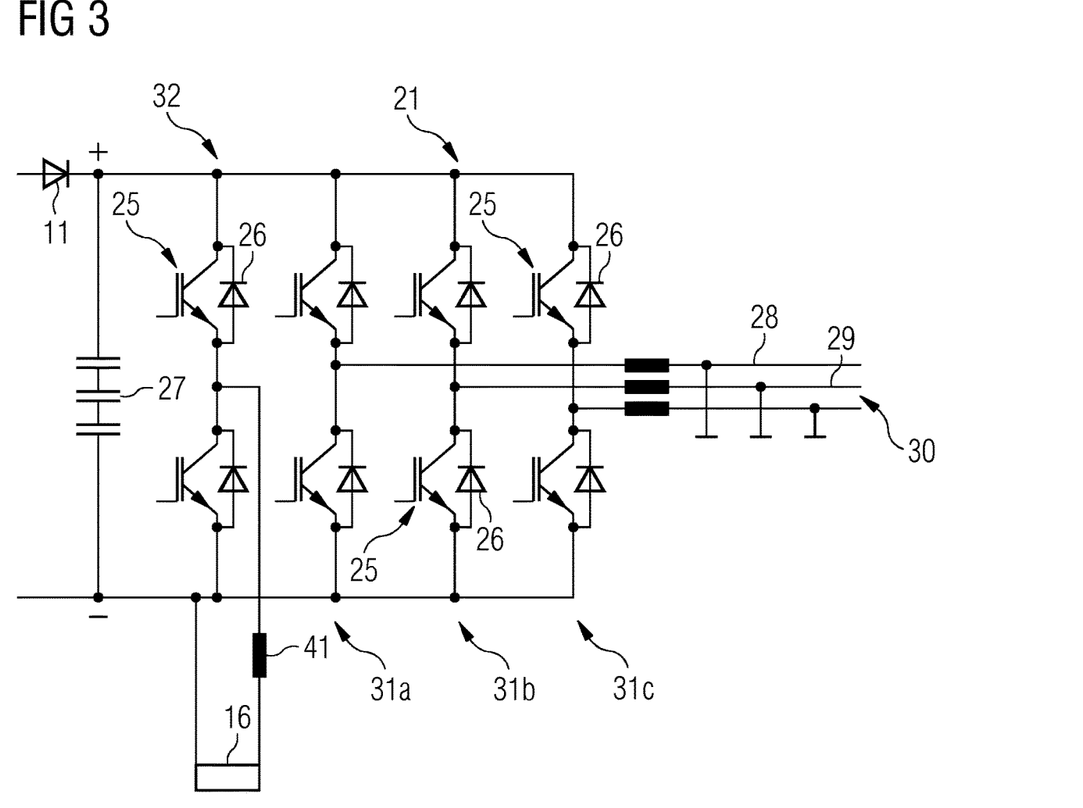
FIG. 3 illustrates more detail of part of FIGS. 2a and 2b.

The converter is shown in more detail in FIG. 3 and comprises a fully three phase module, in this example comprising three phase IGBT bridge. The converter bridge typically comprises semiconductor devices, such as insulated gate bipolar transistors (IGBT) 25, shown in this example as six IGBTs with diodes, typically, snubber or free-wheeling diodes 26. The diodes are shown connected in inverse parallel. Blocking diode 11 is connected between the load and the input to the converter 21. Capacitors 27 may be provided at the input to the converter and each of the three phase outputs 28, 29, 30 come from a leg 31a, 31b, 31c of the converter 21. Unlike a conventional converter, the converter 21 is provided with a fourth leg 32. This fourth leg 32 is connected to an energy storage module 16, such as a battery and acts as a chopper to lift the varying battery voltage to the level required by the load and also to control charging of the energy storage module. The connection may be via fuses 33, inductance 34 and switch 35 as illustrated in FIG. 2a. A plurality of energy storage devices may be connected together in series to form the energy storage module 16. Additionally the fourth leg may be connected to a voltage peak limiter resistor 41 in order to avoid DC peaks in the vessel systems.

Referring again to FIG. 2a, fuses 33, an inductance 34 and breaker 35 may be provided between the energy storage modules 16 and the fourth leg 32 of the converter 21. An LC filter 36, 37 on the AC side of the converter may be provided between the converter and a transformer 38 on the AC side to filter the pulse width modulated output of the converter. A breaker may be provided between the transformer 38 and the load AC bus 22. The drilling equipment, not shown, receives power from, or provides regenerative power to the energy storage module when connected to this AC bus. Additionally, the filtering may make use of the transformer 38 as a second inductance. Where there is limited synchronization to the external grid, a purely inductance based filter may be used. The transformer 38 matches the output voltage to that required, for example, an output voltage of 675V may be matched to an appropriate network voltage, for example 440 VAC, 690V AC or 11 kV AC, depending on the application. If the transformer is not necessary for the application, this element may be omitted. In the examples as illustrated with an adapting transformer 38, the converter may be used for conversion of DC voltage to 50 Hz Ac, or 60 Hz AC for fixed frequency consumers. The system may be used for direct on line (DOL) start of 200 kW AC motors and a non linear load of 70%. The IGBT converter has high overload capacity which gives the possibility of DOL starting of motors up to 200 kW, so making this converter attractive and providing a cost effective solution.

Figure 4:
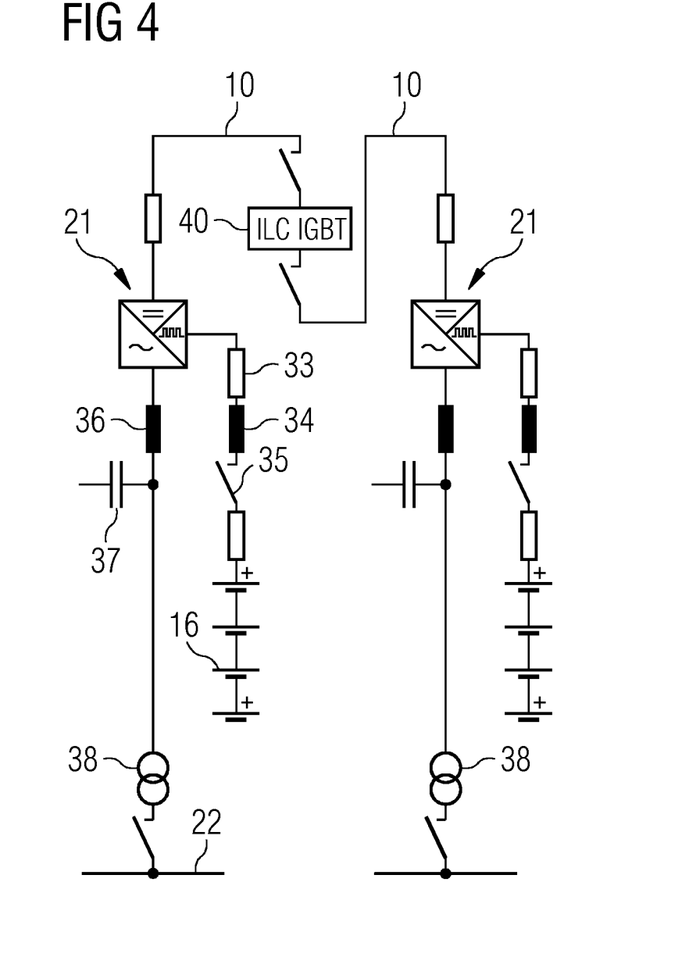
FIG. 4 illustrates detail of an alternative implementation of part of the system of FIG. 1.
Figure 5:
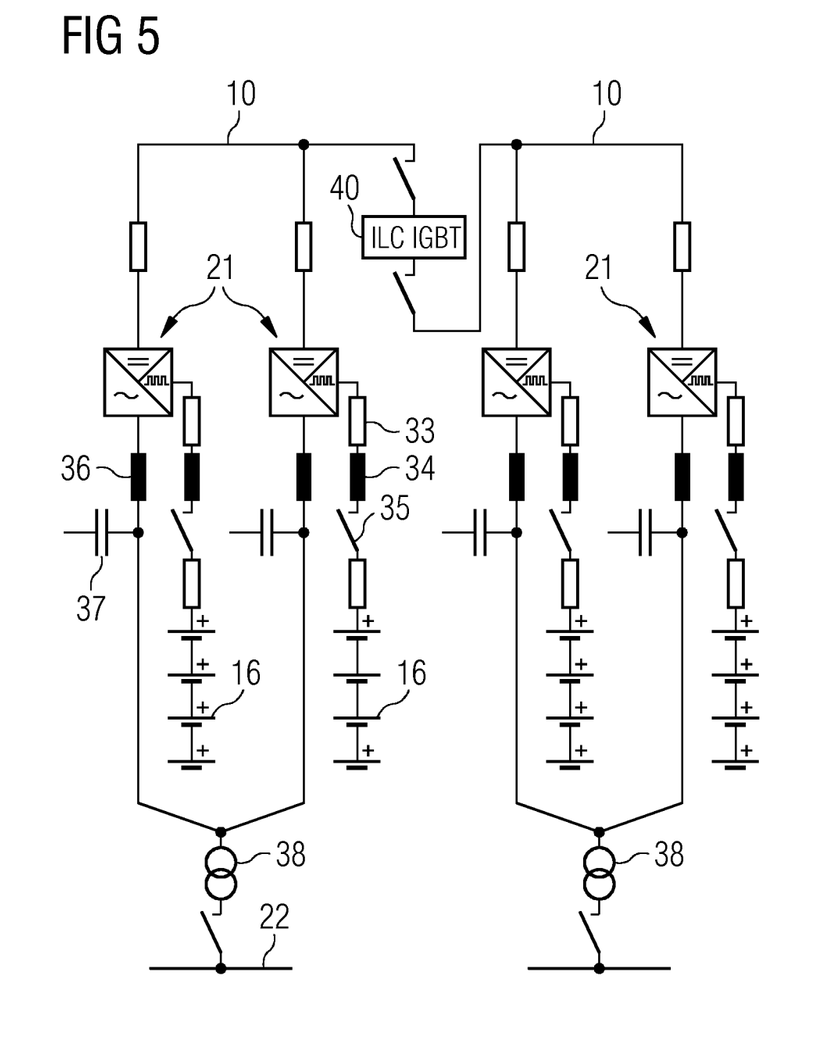
FIG. 5 illustrates a further alternative implementation of part of the system of FIG. 1.

FIGS. 4 and 5 illustrate a further embodiment in which enhanced functionality may be achieved when interconnecting two or more converters each with one or more converters. The interconnection is done by an intelligent load controller 40, connected in series between two breakers, thereby giving full online control of the DC interconnection. For example, a 690V fixed frequency may be generated, connected to the AC medium voltage switchboard 1, 3 of FIG. 1.

Figure 6:
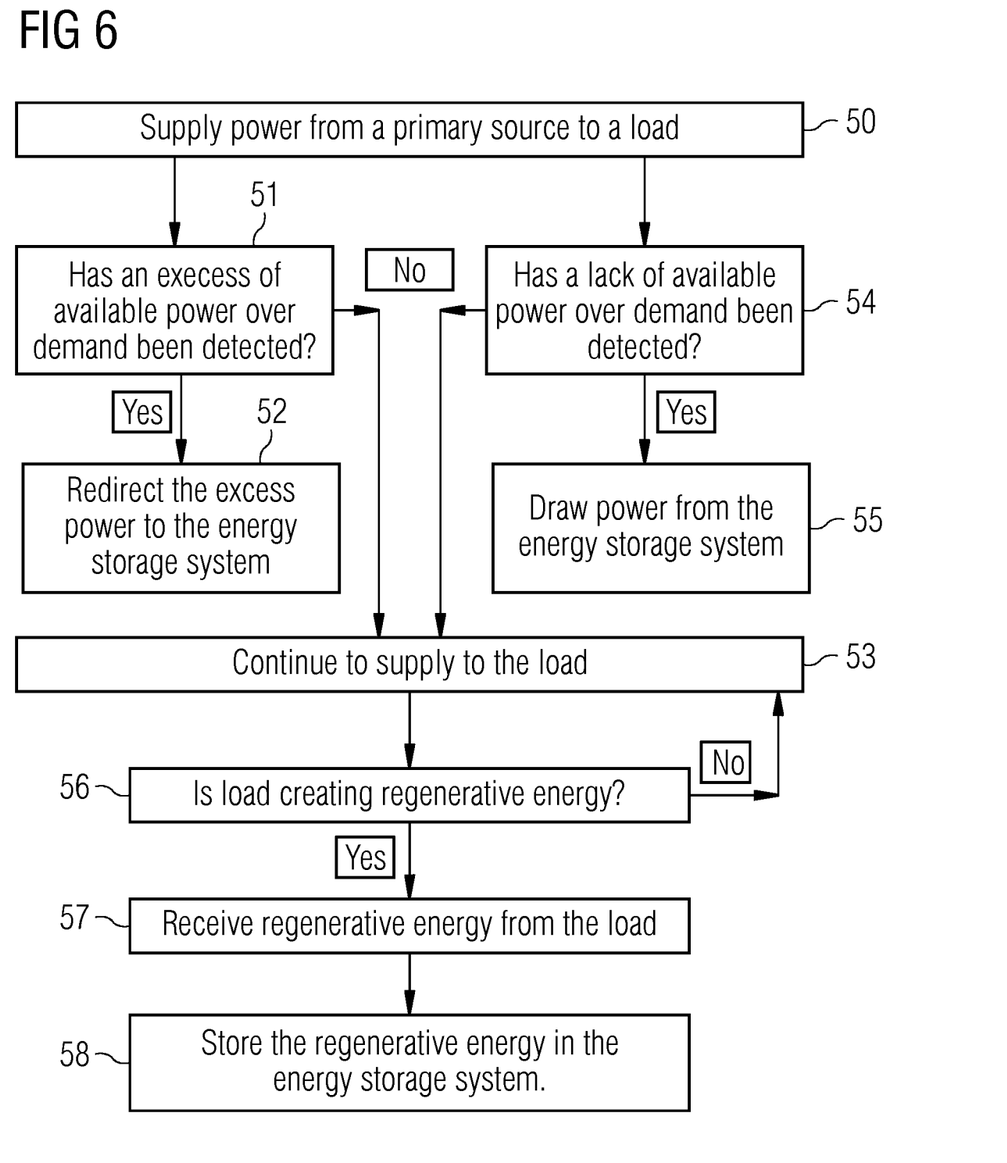
FIG. 6 is a flow diagram illustrating a method of operating power supply system according to the present invention.

An example of a method of operating a power supply system according to the present invention is illustrated in FIG. 6. Power is supplied 50 from a primary power source to a load via a switchboard 1, 3 DC bus 10, converters 21 and AC load bus 22. An energy management system monitors the varying load demand and available power. If an excess of available power over demand is detected 51, then excess power is redirected 52 to an energy storage system 16. If the available power is sufficient for the load demand, then it continues 53 to be supplied to the load. If a lack of available power relative to demand is detected 54, then additional power is drawn 55 from the energy storage system 16. Again, if the test indicates there is no lack of power, the supply to the load continues 53. The energy management system also monitors 56 for regenerative power produced by the load, i.e. by the drilling equipment. If regenerative power is being generated 57, then that is directed to the energy storage system and stored 58 for later use.

The present invention enables fixed frequency AC power to auxiliary loads to be generated with the addition of energy storage as described using the fourth leg of the rectifier as a two quadrant bi-directional chopper. The system may be designed for different AC amp rating according to the requirement, for example, up to 500 kW, or up to 1600 kW. The benefits of the present invention include fuel saving by running fewer diesel generators at better, typically, higher, load conditions. Consequentially, the reduction in fuel use gives rise to reductions in CO2 and NOX emission, so being better for the environment. Additionally, running fewer diesel generators at better load conditions gives savings in terms of running hours and maintenance costs. Operational safety is improved by the provision of energy storage, for example in case of power generation problems. The system may be retrofitted to existing generators to improve performance and handle load variations.

Another advantage, in addition to cost and space saving, is that the drilling drive's regenerative power is used without significant extra equipment being required and the costly braking resistors can be replaced, or avoided. The converter handles both battery power and regenerative power from the drilling drives DC bus.

The detailed description refers to the example of a drilling vessel, or drilling equipment on an offshore platform, however as previously indicted, the invention applicable for any remote location with off-grid supply, where varying loads and reactive power generation make optimisation of the primary energy source more complicated, so drilling rigs on land, in estuaries, lakes, or marine environments may all benefit from the application of the invention. The invention is not limited to drilling and may be applied to other types of remote facilities powering equipment which produces regenerative power, using off-grid supply, such as a wind farm, or production facility on a lake, or other power generation facilities.

The invention claimed is:

1. A power supply system, comprising:
   a primary power source and an energy storage system, wherein the primary power source is adapted to supply power on demand to a load via a load bus; and wherein one or more energy storage modules of the energy storage system are adapted to receive regenerative power from the load bus;
   a converter connected to each of the load bus, the energy storage system, and the primary power source;
   a blocking diode connected directly between the load bus and the converter, to allow a higher DC voltage in the energy storage modules than on the load bus; and
   wherein the converter comprises a three phase voltage source converter for supplying power from the primary power source to the load bus, and for supplying power from the energy storage system to the load bus, and an additional two pulse bridge for receiving regenerative power from the load bus and supplying the regenerative power to the one or more energy storage modules.

2. The system according to claim 1,
   wherein the three phase voltage source converter comprises a six pulse transistor module.

3. The system according to claim 2,
   wherein the six pulse transistor module comprises six insulated gate bipolar transistors with inverse parallel diodes.

4. The system according to claim 1,
   wherein the additional two pulse bridge comprises insulated gate bipolar transistors with inverse parallel diodes.

5. The system according to claim 1,
   wherein the energy storage system comprises one or more energy storage modules connected to the additional two pulse bridge of the converter.

6. The system according to claim 1,
   wherein the primary power source comprises an AC generator; and the power supply system further comprises a transformer comprising primary and secondary windings between the AC generator and the converter.

7. The system according to claim 1,
   wherein the energy storage system further comprises an energy management system, whereby the energy storage system is further adapted to receive power from the primary power source, if a load demand is below an available power from the primary power source.

8. A method of operating a power supply system according to claim 1, the method comprising:
   supplying power from a primary power source to a load; detecting an excess of available power over demand; and redirecting the excess of available power to the energy storage system; or
   supplying power from a primary power source to a load; detecting a lack of available power over demand; and drawing power from the energy storage system; or
   receiving regenerative energy from the load; and storing the regenerative energy in the energy storage system.

9. The system of claim 1,
   wherein the blocking diode is the only component connected between the load bus and the converter, the blocking diode adapted to provide an open or a closed circuit condition therebetween.

10. The system of claim 1,
    wherein the regenerative power supplied from the load bus to the one or more energy storage modules passes through the blocking diode.

* * * * *